W. B. HYDE.
Formation and Bending of Pottery-Pipes.
No. 220,536. Patented Oct. 14, 1879.
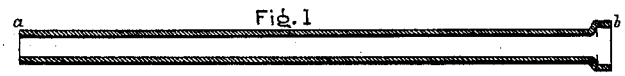
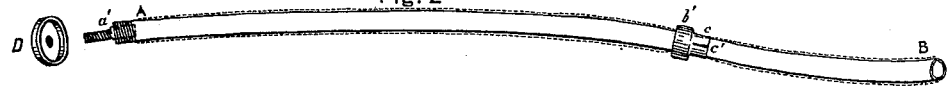
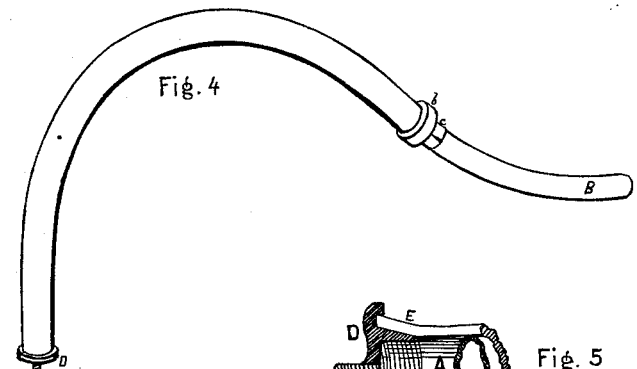
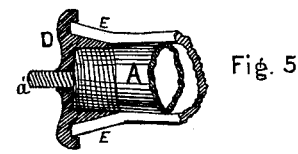
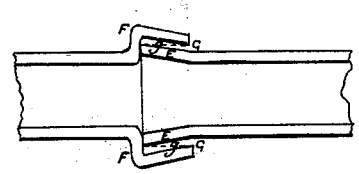
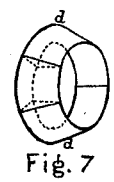
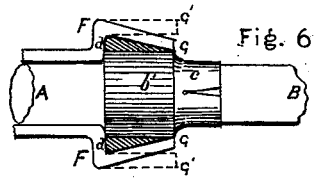
Witnesses:
Geo. H. Strong.
James Smith
Inventor:
William B. Hyde

UNITED STATES PATENT OFFICE.

WILLIAM B. HYDE, OF OAKLAND, CALIFORNIA.

IMPROVEMENT IN THE FORMATION AND BENDING OF POTTERY PIPES.

Specification forming part of Letters Patent No. 220,536, dated October 14, 1879; application filed February 19, 1879.

*To all whom it may concern:*

Be it known that I, WILLIAM B. HYDE, of Oakland, county of Alameda, and State of California, have invented an Improvement in the Formation and Bending of Pottery Pipes; and I hereby declare the following to be a full, clear, and exact description thereof, reference being had to the accompanying drawings.

This invention relates to an improved appliance for the economical production or manufacture of long clay and pottery pipes and tubes, and of bending them in any curve that may be desired without distortion or flattening of cross-section, and also molding the ends for joining in a simple and economical way.

Referring to the drawings, Figure 1 represents a longitudinal section of clay pipe as it would ordinarily be pressed from the dies of a pipe-press.

The figure shows a greater length expressed in diameters than is usual in the manufacture of these articles. One of the difficulties in the way of the manufacture of such relatively long pipes is their distortion, from handling while in the plastic state, from the line or curve required when completed and baked.

To meet this difficulty, referring to Fig. 2, I employ a flexible and partly elastic tube, such as thin and ordinary rubber or canvas hose, and shown by letters A B. One end of this I close by a tight plug, by wrapping with wire, or cementing, or any other convenient means, leaving the other end open to a connection with a liquid or air main or supply-pipe containing such liquid or air under pressure. This tubular flexible mandrel, while empty, I insert through the length of soft plastic pipe as it comes from the press, and then turn on the liquid or air, which, filling the pipe under pressure, instantly gives it a uniform round and firm section, and of a slightly larger diameter than that of the empty tube, (see dotted line in Fig. 2,) thus filling the bore of the plastic pipe, and enabling it to be handled with facility and curved in any desired form, or straightened out, as may be required.

When in the form desired the liquid or air pressure is relieved by suitable cock or other relief-valve. The mandrel contracts to its normal diameter when empty, and can then be easily withdrawn.

When it may be desired to curve a piece of pipe requiring a fixed length after it is curved, as the segments of a circle of a determined diameter, or of a spiral of fixed pitch and diameter, I provide this mandrel with an end plug, (shown at $a'$, Fig. 2,) having a screw-pin projecting beyond the end of the mandrel-tube. The cup-nut D is made to be secured upon this pin.

At the proper distance along the mandrel-tube from the end A, I have a stopper-block, $b'$ $c$, encircling the mandrel tightly enough, so that when the mandrel-tube is under its internal pressure its swelling on each side of this stopper-block will prevent such block from moving either way. This block is shown at $c'$ to have slots in the neck $c$, so as to have some elasticity in its encircling gripe of the mandrel.

The block may be made of any external form to suit the end of the plastic tube to be used. In the figure it is shown of a form to fit the bell end of ordinary drain-pipes. In like manner the cup-nut D, Fig. 2, is shown of a form to encircle the other end of the tube to be handled.

To operate the plastic length of pipe when taken from the press, this empty mandrel is prepared with its stopper-block, and with the cup-nut D off, inserted (see Fig. 3) until the stopper-block fits snugly into the bell end of the length, and the screw end at the other extremity projects. Pressure is then internally applied to the mandrel, which swells into form and position, shrinking lengthwise. The cup-nut D is then screwed on, snugly encircling its end of the soft-clay tube. Thus provided, (see Fig. 4,) the soft pipe can be bent in the form desired, either over a mandrel or in a mold or other convenient device to retain the form after the mandrel is withdrawn.

When bent to the form required the cup-nut D is unscrewed, the internal pressure relaxed, the mandrel shrinks, and can be then withdrawn, having been first coated with some slimy covering, leaving the shaft tube of the exact form and length required to dry sufficiently to go into the baking-oven.

There are many instances in the arts wherein fire-clay or earthenware tubes, in form of coils or other useful combinations, would be used, had there been any economical method of giving such tubes the curves required to finally make up into the coil desired, and also had there been any good and cheap form of joint which, when made, would withstand moderate strains before rupture or separation at the socket.

Adopting the joint shown in longitudinal section in Fig. 5 as the best for such pipes if forms of the two ends can be rapidly made with safety to the desired curves of the pipe, to secure this end and as a special form of my mandrel which I desire to secure by Letters Patent, I modify the cup-nut and stopper-block of the mandrel as follows:

For the small end of the pipe the cup-nut is made, as shown in shaded section in Fig. 5, with a hollow conical projection, the cone of which, as it is screwed onto the end of the mandrel, presses the soft clay outward until it has assumed the flare or outer funnel shape required, and is held in that position by the projecting outer rim of the cup-nut. This nut, instead of itself being fitted to the thread of the pin $a'$, may be bored so as to slip over it and be followed and held in place by an ordinary nut. Under some circumstances this would be more desirable than to revolve the cup-nut itself.

For the larger or bell end of the joint I make the stopper-block in the mandrel in two parts—a stationary part, (see Fig. 6,) in which the diameter of the cylindrical portion of the block $b'$ $c$ is the same or slightly less than the inside of the small end G G of the bell. Encircling this permanent cylindrical portion of the stopper-block is a ring, conical outside and cylindrical inside, said ring being made in three pieces, so as to be subsequently easily removed. This ring is shown in shaded section, as $d\ d$, Fig. 6, and in perspective in Fig. 7.

The plastic pipe from the press is delivered with its bell end in the cylindrical form, the longitudinal section of which is shown by dotted portions F G, Fig. 6. In this shape the mandrel is inserted in the pipe, the ring $d\ d$ placed around the permanent part of the stopper-block, and while held there the bell end is kneaded down by the hand to a close fit around the conical part of the ring, all as shown by the section F G. When the mandrel is withdrawn the ring is left inside the now conical bell end, and it is in turn removed by first taking away the small piece, the other two easily following. The ends of the pipes being fitted in this manner, it is seen that when they are placed one within the other, Fig. 8, a conical annulus is left between them. This space being filled in with fire-clay or cement, becoming hardened by the action of fire or time, makes an effective substantial joint.

What I now claim, and desire to secure by Letters Patent, is—

1. The improvement in bending or shaping clay or pottery pipes, consisting in the introduction to the plastic pipe of an elastic flexible tube or hose, A B, and applying to the same an internal pressure of liquid or air to maintain its tubular shape while bending, substantially as herein described.

2. The elastic or flexible tube or hose A B, as shown, in combination with the stopper-block $b'\ c$ and plug or screw end $a'$, with its cup or washer D, substantially as and for the purpose herein described.

3. The device or stopper-block $b'\ c$, with its surrounding divided conical or flaring ring $d\ d$, whereby the bell end of the pipe may be contracted to form a hollow frustum of a cone to receive the opposite or flaring end of the pipe, and the ring $d\ d$ removed, substantially as herein described.

4. The improvement in the formation of the joints of clay or pottery pipes, consisting in forming the bell or receiving end with a contracting or tapering opening outwardly from the shoulder to receive the opposite end, which is made flaring by means substantially as herein described.

In witness whereof I have hereunto set my hand.

WILLIAM B. HYDE.

Witnesses:
 FRANK A. BROOKS,
 CHAS. G. YALE.